(12) United States Patent
Gao et al.

(10) Patent No.: US 11,978,864 B2
(45) Date of Patent: May 7, 2024

(54) BATTERY MODULE, BATTERY BOX, AND AUTOMOBILE

(71) Applicant: CONTEMPORARY AMPEREX TECHNOLOGY CO., LIMITED, Ningde (CN)

(72) Inventors: Hanqing Gao, Ningde (CN); Chuanlian Chen, Ningde (CN); Xiaolong Ouyang, Ningde (CN); Xiaowei Hu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 755 days.

(21) Appl. No.: 17/125,938

(22) Filed: Dec. 17, 2020

(65) Prior Publication Data

US 2021/0104779 A1   Apr. 8, 2021

Related U.S. Application Data

(63) Continuation of application No. PCT/CN2019/108131, filed on Sep. 26, 2019.

(30) Foreign Application Priority Data

Sep. 30, 2018 (CN) .......................... 201821619716.X (51) Int. Cl.
*H01M 50/00* (2021.01)
*H01M 10/42* (2006.01)
(Continued)

(52) U.S. Cl.
CPC ....... *H01M 10/425* (2013.01); *H01M 50/204* (2021.01); *H01M 50/207* (2021.01);
(Continued)

(58) Field of Classification Search
CPC ............. H01M 10/425; H01M 50/207; H01M 50/244; H01M 50/284; H01M 50/249
See application file for complete search history.

(56) References Cited

U.S. PATENT DOCUMENTS

| 9,620,761 | B2 | 4/2017 | Smith et al. |
| 2012/0003505 | A1 | 1/2012 | Kim |

(Continued)

FOREIGN PATENT DOCUMENTS

| CN | 203631621 U | 6/2014 |
| CN | 204966568 U | 1/2016 |

(Continued)

OTHER PUBLICATIONS

Contemporary Amperex Technology Co., Limited, International Search Report and Written Opinion, PCTCN2019108131, Dec. 27, 2019, 14 pgs.

(Continued)

*Primary Examiner* — Cynthia H Kelly
*Assistant Examiner* — Monique M Wills
(74) *Attorney, Agent, or Firm* — Kilpatrick Townsend & Stockton LLP (57) ABSTRACT

This application relates to the field of battery technologies, and provides a battery module, a battery pack, and an automobile. The battery module includes two or more battery cells; a module frame, including an end plate and a side plate. The end plate and the side plate form the module frame for fixing the two or more battery cells and a cell management unit is disposed on the end plate and connected to a sampling line of the two or more battery cells. The cell management unit is disposed on the end plate inside the module frame, which facilitates wiring of the sampling line of the battery cells, thus ensuring an effective energy density of the battery module and balancing the wiring of the (Continued)

sampling line of the battery cells and the energy density of the battery module.

16 Claims, 4 Drawing Sheets

(51) Int. Cl.
    *H01M 50/204*     (2021.01)
    *H01M 50/207*     (2021.01)
    *H01M 50/244*     (2021.01)
    *H01M 50/249*     (2021.01)
    *H01M 50/284*     (2021.01)

(52) U.S. Cl.
    CPC ....... *H01M 50/244* (2021.01); *H01M 50/249* (2021.01); *H01M 50/284* (2021.01); *H01M 2010/4271* (2013.01); *H01M 2220/20* (2013.01)

(56) References Cited

U.S. PATENT DOCUMENTS

| | | |
|---|---|---|
| 2014/0162101 A1 | 6/2014 | Wang et al. |
| 2016/0072112 A1 | 3/2016 | Smith et al. |
| 2017/0263910 A1 | 9/2017 | Kobayashi et al. |
| 2017/0301961 A1* | 10/2017 | Kim .................... H01M 50/522 |
| 2018/0205055 A1* | 7/2018 | Hilligoss ............. H01M 10/443 |

FOREIGN PATENT DOCUMENTS

| | | |
|---|---|---|
| CN | 106575725 A | 4/2017 |
| CN | 206327164 U | 7/2017 |
| CN | 209016124 U | 6/2019 |
| WO | WO2013023524 A1 | 2/2013 |

OTHER PUBLICATIONS

Contemporary Amperex Technology Co., Limited, International, Extended European Search Report, EP19867342.8, dated Sep. 10, 2021, 8 pgs.

* cited by examiner

BATTERY MODULE, BATTERY BOX, AND AUTOMOBILE

CROSS-REFERENCE TO RELATED APPLICATIONS

This application is a continuation application of PCT Patent Application No. PCT/CN2019/108131, entitled "BATTERY MODULE, BATTERY BOX, AND VEHICLE" filed on Sep. 26, 2019, which claims priority to Chinese Patent Application No. 201821619716.X, filed with the State Intellectual Property Office of the People's Republic of China on Sep. 30, 2018, and entitled "BATTERY MODULE", all of which are incorporated herein by reference in their entirety.

TECHNICAL FIELD

This application relates to the field of battery technologies, and in particular, to a structure of a cell management circuit board in a battery module.

BACKGROUND

A battery module generally contains a plurality of battery cells disposed side by side connected in series or in parallel. To monitor parameters such as voltage and temperature of each battery cell, a sampling line and a cell management unit connected to the sampling line need to be provided for the battery cell. An English acronym of the cell management unit is CMU (that is, an acronym of Cell Management Unit, also referred to as a slave board).

In the prior art, there are two schemes for disposing the cell management unit. One is disposing the cell management unit outside the battery module, and the other is disposing the cell management unit inside the battery module at the top. Both the schemes have disadvantages in design. Disposing the cell management unit outside the battery module increases a length and a quantity of sampling lines inside the battery module, thereby increasing wiring complexity. Whereas, disposing the cell management unit inside the battery module at the top increases a height of the module, thereby reducing an energy density of the battery module.

SUMMARY

An objective of this application is to provide a novel battery module, battery box, and automobile, to resolve the inability to balance wiring of a sampling line of battery cells in an existing battery module and an energy density of the battery module.

According to a first aspect, an embodiment of this application provides a battery module, including:
two or more battery cells;
a module frame, including an end plate and a side plate, the end plate and the side plate forming the module frame for fixing the two or more battery cells; and
a cell management unit, disposed on the end plate and connected to a sampling line of the two or more battery cells.

Further, a first limiting element is disposed on each side of the end plate, and the first limiting element protrudes from an outer surface of the end plate; and
each side of the cell management unit abuts a corresponding first limiting element.

Further, a second limiting element is disposed at the bottom of the end plate, and the second limiting element protrudes from an outer surface of the end plate; and
a lower edge of the cell management unit abuts an upper surface of the second limiting element.

Further, the cell management unit is connected to the sampling line of the two or more battery cells by using a connector assembly; and
the cell management unit is fixed to an outer surface of the end plate, and the end plate is provided with a first hollow groove for avoiding the connector assembly.

Further, the first hollow groove is located at the top of the end plate;
the connector assembly includes a connection harness, a first connector, and a second connector, where the first connector and the second connector are disposed at two ends of the connection harness; and
the first connector is connected to the sampling line of the two or more battery cells, and the second connector is connected to the cell management unit.

Further, the cell management unit is provided with a second hollow groove, the second hollow groove is adjacent to the first hollow groove, and the second connector is disposed on an outer surface of the cell management unit.

Further, the cell management unit includes a cell management circuit board and a circuit box, where the circuit box is fixed to the outer surface of the end plate, and the cell management circuit board is disposed in the circuit box.

Further, the circuit box is provided with a third limiting element, where the third limiting element protrudes from an outer surface of the circuit box; and
the third limiting element is located below the connection harness, and abuts an outer wall of the connection harness.

Further, the third limiting element is provided with a fixing hole, and the connection harness is connected to the fixing hole of the third limiting element by using a fixing strap.

Further, the sampling line of the two or more battery cells is a flexible circuit board.

Further, an inner surface of the end plate faces a primary surface of a battery cell at an end of the module frame.

According to a second aspect, an embodiment of this application provides a battery box, the battery box including the battery module according to any one of the foregoing implementations.

Further, the battery box further includes a battery management system, and the battery management system is connected to the cell management unit.

According to a third aspect, an embodiment of this application provides an automobile, including the battery module according to any one of the foregoing implementations.

Further, the automobile further includes a battery management system, and the battery management system is connected to the cell management unit.

According to a fourth aspect, an embodiment of this application provides a manufacturing method of a battery module, including:
disposing two or more battery cells side by side;
disposing an end plate at an end of the two or more battery cells disposed side by side; and
connecting a cell management unit to the end plate.

Further, the manufacturing method further includes:
making an inner surface of the end plate opposite to a primary face of a battery cell at an end of the battery module.

Further, the manufacturing method further includes: connecting a side plate to the end plate, so that the side plate and the end plate are connected end to end to form a module frame.

Further, the manufacturing method further includes: connecting a sampling line to the two or more battery cells.

Further, the manufacturing method further includes: connecting the cell management unit to a sampling line.

The technical solutions provided in this application can achieve the following beneficial effects:

Unlike the prior art, in the battery module in the foregoing technical solution, the cell management unit is disposed on the end plate of the module frame, facilitating wiring of the sampling line of the two or more battery cells on the one hand; on the other hand, disposing the cell management unit on the end plate allows effective use of the end space of the module frame, without increasing a height of the battery module, thus ensuring effective energy density of the battery module, balancing wiring of the sampling line of the two or more battery cells and the energy density of the battery module.

It should be understood that the foregoing general descriptions and the following detailed descriptions are merely examples, and do not constitute any limitation on this application.

Reference numerals in the accompanying drawings are described as follows:

1. cell management unit;
11. cell management circuit board;
111. hollow groove;
12. rear cover;
121. hollow groove;
13. front cover;
131. hollow groove;
132. connector opening;
133. connector opening;
134. third limiting element;
134a. fixing hole;
14. connector assembly;
141. connection harness;
142. second connector;
143. first connector;
144. output socket;
145. fixing strap;
15. second hollow groove;
2. battery cell;
3. side plate;
4. end plate;
41. first hollow groove;
411. side structure of the first hollow groove;
42. first limiting element;
43. fixing hole;
5. sampling line; and
6. bolt.

The accompanying drawings herein are incorporated into and constitute a part of the specification. They show embodiments that conform to this application, and are used in combination with the specification to explain rationale of this application.

DESCRIPTION OF EMBODIMENTS

To describe in detail the technical content, structural features, and achieved objectives and effects of the technical solutions, the following provides detailed descriptions with reference to specific embodiments and accompanying drawings.

Figure 1:
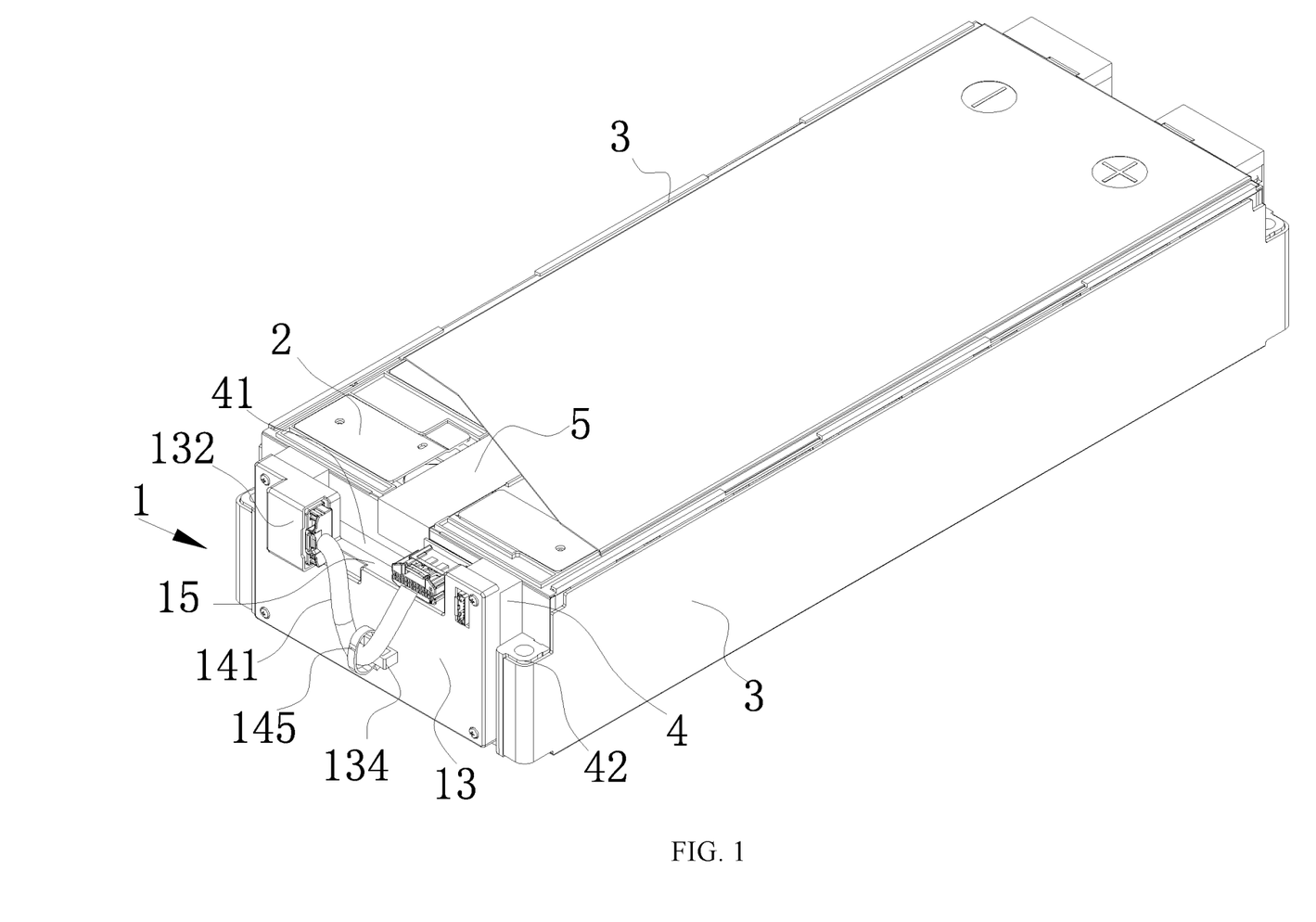
FIG. 1 is a schematic structural diagram of a battery module according to a specific embodiment.

Referring to FIG. 1 to FIG. 4, an embodiment provides a battery module. As shown in FIG. 1, the battery module includes a module frame, two or more battery cells 2, and a cell management unit 1.

The battery cells 2 are energy storage units of the battery module, and are configured to store electrical energy and provide electrical energy to the outside. There are two or more battery cells 2. The two or more battery cells 2 may be connected in series or parallel, and the battery cells 2 may be disposed side by side in two or more columns. Two adjacent battery cells 2 in each column of battery cells are disposed with primary surfaces of their housings facing each other. Two adjacent columns of battery cells are disposed with their housings facing each other.

The module frame includes at least two oppositely disposed end plates 4 and two oppositely disposed side plates 3. The end plates 4 and the side plates 3 are connected to each other end to end to enclose an accommodating cavity for accommodating the battery cells 2 (that is, a position at which the battery cells 2 are placed). The module frame can serve a purpose of fixing and protecting the battery cells 2 to prevent the battery cells 4 from being displaced or being hit or scratched by an external object. The module frame may be formed by connecting metal sheets such as aluminum alloy or steel sheets.

The module may be a rectangular housing, and the plurality of battery cells 2 are arranged in sequence along a length direction of the module frame. A direction of primary surfaces of housings of the battery cells 2 is consistent with the length direction of the module frame. The end plates 4 are disposed at ends of the module frame, and inner surfaces of the end plates 4 are opposite to the primary surfaces of battery cells 2 at the ends of the module frame. The end plates 4 on the one hand can limit positions of the battery cells 2, and on the other hand can absorb stress produced when the battery cells 2 swell, to prevent the battery cells 2 from breaking due to swelling. An end of the module frame is an end in a length direction of the module frame. A power input/output interface is provided on an outer surface of the module frame, and the power input/output interface is electrically connected to the battery cells 2.

The cell management unit 1 is configured to collect information such as voltage and temperature of the battery cells 2, and send the collected information to a battery management system. The cell management unit 1 is disposed on one of the end plates 4, and the cell management unit 1 is connected to a sampling line 5 of the battery cells 2. The sampling line 5 may be electrically connected to poles of the battery cells 2 to collect the voltage information of the battery cells. Further, the sampling line 5 may be connected to a temperature sensor, and the temperature sensor may be in contact with the battery cells 2 to collect the temperature information of the battery cells 2.

As shown in FIG. 1, in this embodiment, the cell management unit 1 is disposed on the end plate 4. This allows effective use of the end space of the battery module without occupying space in a height direction of the battery module, helping improve an energy density of the battery module. In addition, disposing the cell management unit 1 inside the battery module (compared with disposing the cell management unit outside the battery module) is more convenient for connection wiring of the cell management unit 1 and the battery cells 2.

In some embodiments, the sampling line 5 of the battery cells 2 is a flexible circuit board. The flexible circuit board is also referred to as an FPC, and has advantages such as being thin and bendable. Therefore, it essentially does not occupy space at the top of the battery module, facilitating an energy density of the battery module. In addition, the flexible circuit board being bendable also facilitates wiring of the sampling line.

Figure 2:
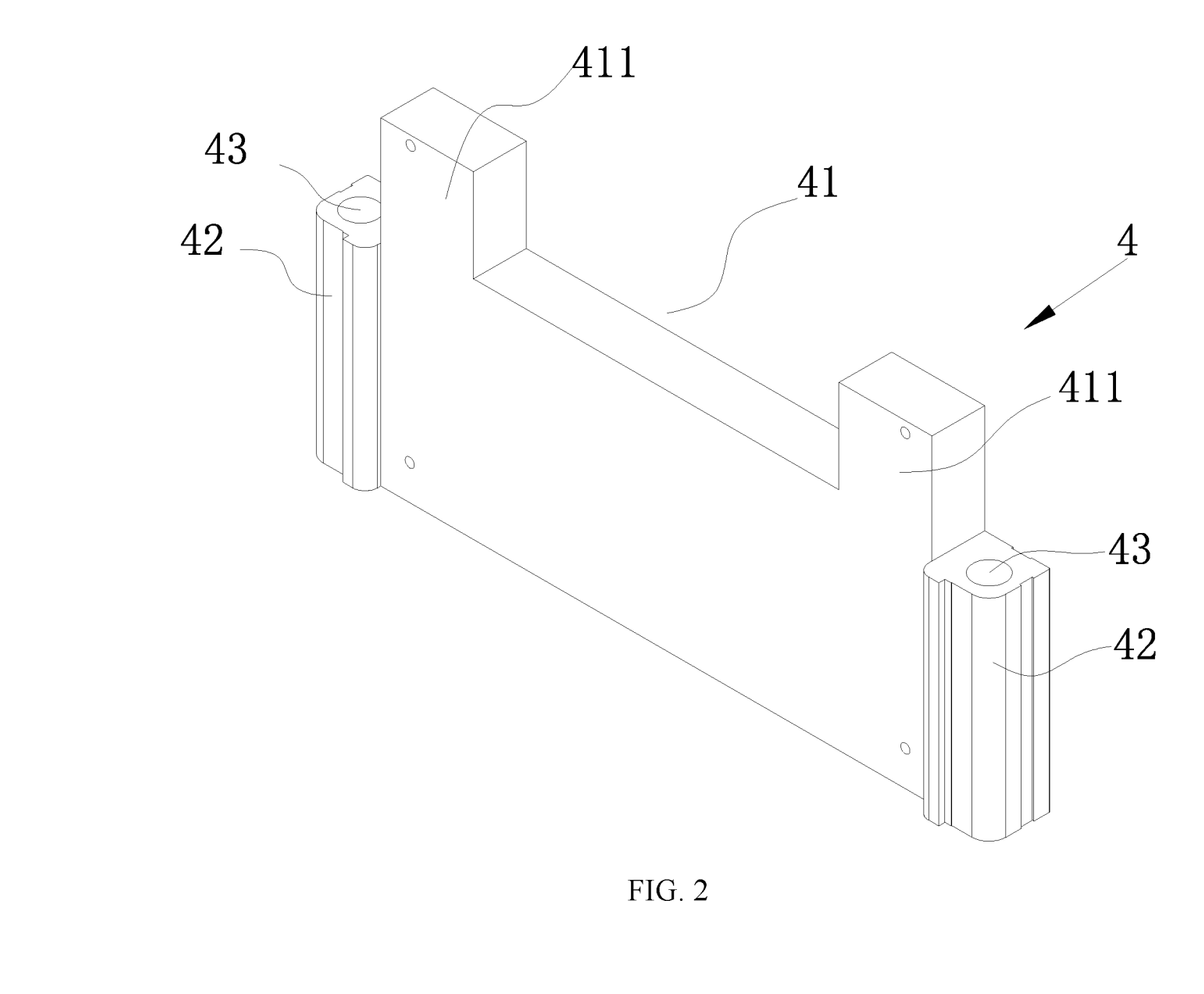
FIG. 2 is a schematic structural diagram of an end plate according to a specific embodiment.

FIG. 2 is a schematic structural diagram of the end plate. A first limiting element 42 is disposed on each side of the end plate 4, and the first limiting elements 42 are configured to limit positions of the cell management unit 1 on the two sides, preventing the cell management unit 1 from moving toward the two sides. The first limiting elements 42 protrude from an outer surface of the end plate 4, so that a limiting groove is formed between the two first limiting elements 42. As shown in FIG. 1, the cell management unit 1 is disposed in the limiting groove formed by the two first limiting elements 42, and in a left-right direction, one side of the cell management unit 1 abuts a first limiting element 42 on the corresponding side, and the other side abuts the other first limiting element 42 on the end plate 4. Therefore, the two first limiting elements 42 can limit left-right displacement of the cell management unit 1, and can effectively prevent displacement of the cell management unit 1 especially when the battery module is applied to a new energy vehicle.

To further prevent displacement of the cell management unit 1 in a vertical direction, in an embodiment, the bottom of the cell management unit 1 may press against a bottom plate of a battery box, thereby limiting downward displacement of the cell management unit 1 with the help of the bottom plate of the battery box. Alternatively, in some other embodiments, a second limiting element protruding from the outer surface may be disposed at the bottom of the end plate 4, so that a lower edge of the cell management unit 1 abuts an upper surface of the second limiting element, thereby limiting downward displacement of the cell management unit 1.

As shown in FIG. 2, the first limiting elements 42 on the two sides of the end plate 4 are further provided with fixing holes 43. The fixing holes 43 are configured to fix the module in the battery box. The fixing holes 43 extend downward from the top of the first limiting elements 42 and penetrate the bottom of the first limiting elements 42. When fixing the module frame, long bolts are led through the fixing holes 43 and fixed to the bottom of the battery box by using nuts.

Providing the fixing holes 43 on the first limiting elements 42 on the two sides can fix the two sides of the end plate 4, so that the middle of the end plate 4 has a relatively large deformation range and can absorb more swelling stress of the battery cells 2.

Figure 3:
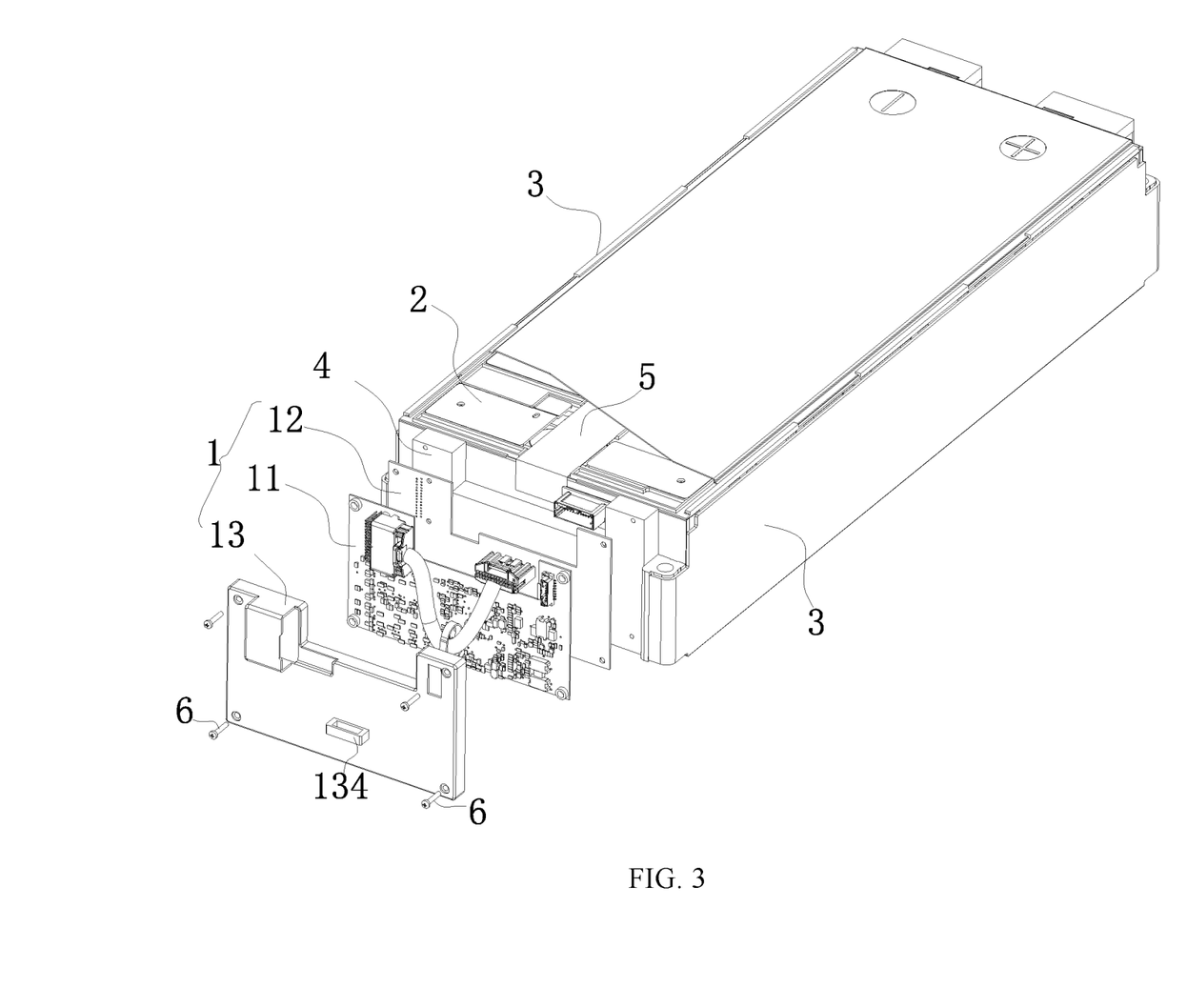
FIG. 3 is an exploded view of an end of a battery module according to a specific embodiment.

FIG. 3 is an exploded view of an end of the battery module in an embodiment. The cell management unit 1 includes a cell management circuit board 11 and a circuit box. The circuit box includes a front cover 13 and a rear cover 12. The front cover 13 and the rear cover 12 jointly form a cavity for accommodating the cell management circuit board 11. The cell management circuit board 11 is disposed in the circuit box formed by the front cover 13 and the rear cover 12. The circuit box may be fixed to the outer surface of the end plate 4 by using bolts 6 (but not limited to using the bolts 6). The cell management circuit board 11 is disposed in the circuit box, so that the circuit box can protect the cell management circuit board 11 and prevent a force of the end plate 4 from being directly applied to the cell management circuit board 11.

Figure 4:
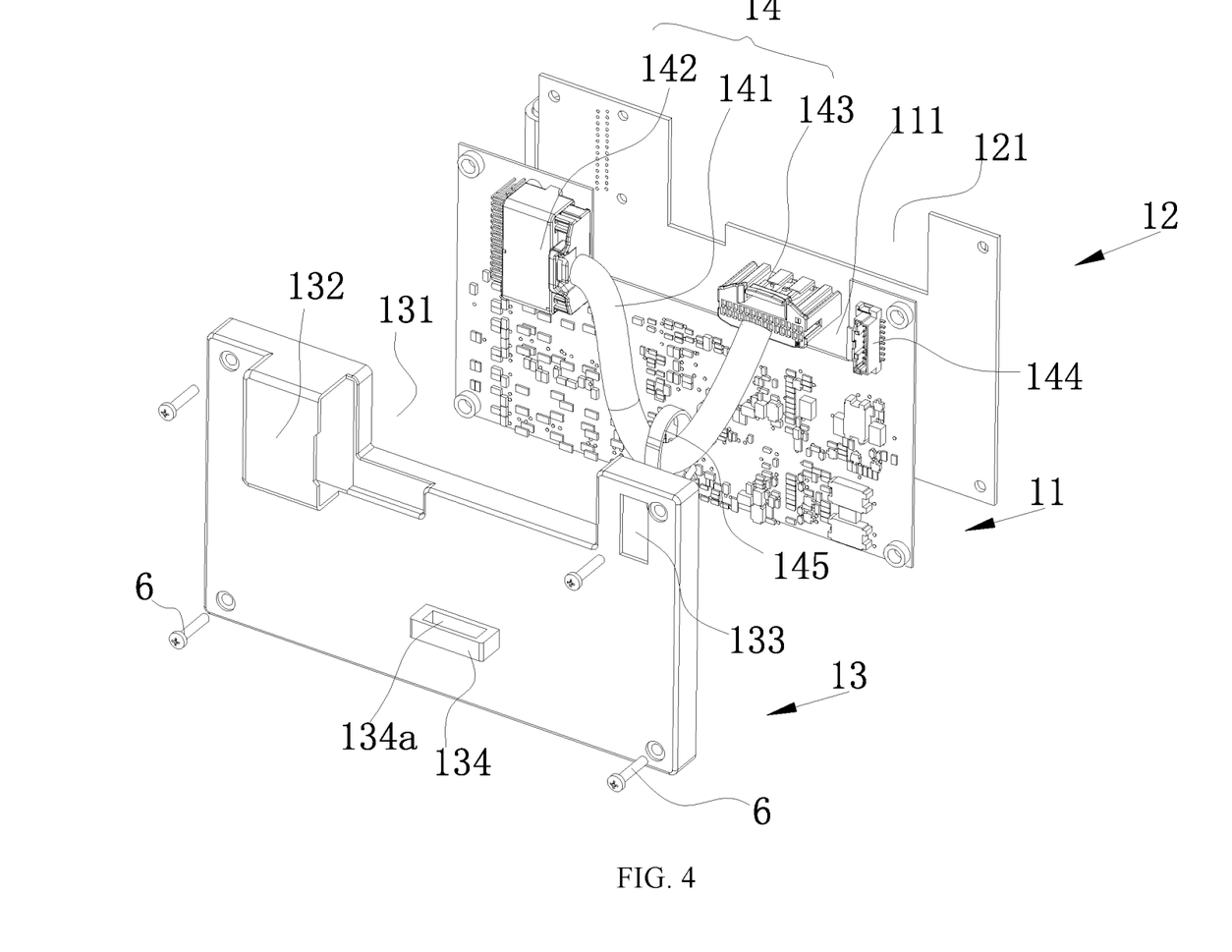
FIG. 4 is an exploded view of a cell management unit according to a specific embodiment.

FIG. 4 is an exploded view of the cell management unit 1. The cell management unit 1 is connected to the sampling line 5 of the battery cells 2 by using a connector assembly 14, and the information collected by the sampling line 5 is transmitted to the cell management unit 1 through the connector assembly 14. The connector assembly 14 includes a connection harness 141, a first connector 143, and a second connector 142. The first connector 143 is disposed at one end of the connection harness 141, and the second connector 142 is disposed at the other end of the connection harness 141. The first connector 143 is configured to be electrically connected to the sampling line 5. The first connector 143 includes a plug (or a socket) fixed to one end of the connection harness 141, and a socket matching the plug (or a plug matching the socket) and fixed to an end of the sampling line 5. The second connector 142 is configured to be electrically connected to the cell management circuit board 11. The second connector 142 includes a plug (or a socket) fixed to the other end of the connection harness 141, and a socket matching the plug (or a plug matching the socket) and fixed to the cell management circuit board 11. Connecting the cell management unit 1 to the sampling line 5 by using the connector assembly 14 can not only provide a stable and reliable connection and ensure reliability of information collection, but also facilitate mounting and daily maintenance of the cell management unit 1.

In the foregoing embodiments of FIG. 3 and FIG. 4, a connector assembly is disposed at both ends of the connection harness 141, so that the connection harness 141, the sampling line 5, and the cell management unit 1 are all detachably connected. However, in some embodiments, only one pair of connectors may be disposed for the connector assembly 14. To be specific, one end of the connection harness 141 is provided with a connector assembly, and the other end of the connection harness 141 is directly electrically connected to the cell management unit 1 or the sampling line 5.

As shown in FIG. 2, in a specific embodiment, the end plate 4 is provided with a first hollow groove 41. As shown in FIG. 1 and FIG. 3, the first hollow groove 41 is configured to avoid the connection harness 141 and the first connector 143. It can be learned from FIG. 1 that the sampling line 5 is located at the top of the battery cells 2, and that the end of the sampling line 5 extends to an inner side face of the end plate 4. The end plate 4 is provided with the first hollow groove 41, and the connection harness 141 and the first connector 143 at the end thereof pass through the first hollow groove 41 to connect to the sampling line 5, so that the first connector 143 is exactly located in the first hollow groove 41. Because the first connector 143 has a specific volume, providing the first hollow groove 41 on the end plate 4 and making the first connector 143 located in the first hollow groove 41 can reduce a volume in a length direction of the battery module, thereby further improving space utilization of the battery module and improving the energy density of the battery module.

As shown in FIG. 1, the first hollow groove 41 is located at the top of the end plate 4, and the cell management unit 1 is provided with a second hollow groove 15, where the second hollow groove 15 is opposite to the first hollow groove 41 in front-back positions, and the second connector 142 is disposed on an outer surface of the cell management unit 1. Specifically, as shown in FIG. 4, the cell management unit 1 includes a cell management circuit board 11, a front cover 13, and a rear cover 12. The second hollow groove 15 is formed by stacking a hollow groove 131 at the top of the front cover 13, a hollow groove 111 at the top of the cell management circuit board 11, and a hollow groove 121 at the top of the rear cover 12.

The second connector 142 is connected to an outer surface of the cell management circuit board 11, and a junction between the second connector 142 and the cell management circuit board 11 is located on a side edge of the second hollow groove 15. A connector opening 132 is provided on a surface of the front cover, and a connector disposed at an end of the connection harness 141 is connected to a connector disposed on the cell management circuit board 11 through the connector opening 132. The other end of the connection harness 141 and the first connector 143 are connected to the sampling line 5 through the second hollow groove 15 (that is, the hollow grooves 131, 111, and 121) and the first hollow groove. The second connector 142 is disposed on the outer surface of the cell management unit 1 to facilitate operations on the second connector 142, and the second hollow groove 15 is provided to facilitate wiring of the connection harness 141.

The cell management unit 1 and the battery management system may alternatively be connected by using a connector assembly. As shown in FIG. 4, an output socket 144 is further disposed in the upper right corner of the cell management circuit board 11 (certainly, in other embodiments, the output socket 144 may be disposed at other positions in the cell management circuit board 11), and a connector opening 133 is provided at a corresponding position on the front cover 13. The output socket 144 is exposed outside the front cover 13 through the connector opening 133, and the battery management system may obtain sampled information of the battery cells 2 by using the output socket 144 and the cell management circuit board 11.

As shown in FIG. 1, FIG. 3, and FIG. 4, to improve connection reliability of the connection harness 141, a third limiting element 134 protruding from an outer surface is disposed on the circuit box (composed of the front cover 13 and the rear cover 12). The third limiting element 134 is specifically disposed in the lower middle of an outer surface of the front cover 13, and a specific position thereof may be determined based on a length of the connection harness 141, such that the third limiting element 134 is exactly located under the lowest part of the connection harness, and that an outer wall of the lowest part of the connection harness 141 abuts the third limiting element. The third limiting element 134 can support partial weight of the connection harness 141, and when the battery module shakes up and down, the third limiting element 134 can limit downward movement of the connection harness 141, so as to effectively prevent the connection harness 141 from loosening or falling off, and improve connection reliability of the connection harness 141.

To further ensure the connection reliability of the connection harness 141, a fixing hole 134a may be further provided on the third limiting element 134, and a fixing strap 145 passes through the fixing hole 134a to fix the lowest part of the connection harness 141 to the third limiting element 134. Preferably, the fixing strap may be a nylon cable tie with inverted teeth.

An embodiment of this application further provides a battery box, where the battery box includes the battery module according to any embodiment of this application.

Further, the battery box further includes a battery management system, and the battery management system is connected to the cell management unit 1.

An embodiment of this application further provides an automobile, including the battery module according to any embodiment of this application.

Further, the automobile further includes a battery management system, and the battery management system is connected to the cell management unit 1.

An embodiment of this application further provides a manufacturing method of a battery module, including:
 disposing two or more battery cells side by side;
 disposing an end plate at an end of the battery cells disposed side by side; and
 connecting a cell management unit to the end plate.

Further, the disposing an end plate at an end of the battery cells disposed side by side includes:
 making an inner surface of the end plate opposite to a primary surface of a battery cell.

Further, the manufacturing method further includes:
 connecting a side plate to the end plate, so that the side plate and the end plate are connected end to end to form a module frame.

Further, the manufacturing method further includes:
 connecting a sampling line to the battery cells.

Further, the manufacturing method further includes:
 connecting the cell management unit to a sampling line.

It should be noted that, in the descriptions of this application, unless otherwise specified and defined explicitly, the terms "first" and "second" are merely intended for a purpose of description, and should not be understood as an indication or implication of relative importance, and the terms "connection" and "fixing" should be understood in their general senses. For example, the "connection" may be a fixed connection, a detachable connection, an integrated connection, or an electrical connection; or may be a direct connection, or an indirect connection through an intermediate medium. A person of ordinary skill in the art can understand specific meanings of the foregoing terms in the present invention according to a specific situation.

In the descriptions of the specification, it should be understood that the directional terms such as "up", "down", "left", and "right" described in the embodiments of this application are described as seen from the angles shown in the accompanying drawings, and should not be understood as a limitation to the embodiments of this application In addition, in the context, it should be further understood that when an element is referred to as being "above" or "under" another element, the element can not only be directly connected "above" or "under" the another element, but also be indirectly connected "above" or "under" the another element through an intermediate element.

What is claimed is:

1. A battery module, comprising:
 two or more battery cells;
 a module frame, comprising an end plate and a side plate, wherein the end plate and the side plate form the module frame for fixing the battery cells; and
 a cell management unit, disposed on the end plate and connected to a sampling line of the battery cells by using a connector assembly, wherein the cell management unit is fixed to an outer surface of the end plate, and the end plate has a first hollow groove for avoiding the connector assembly;

wherein the sampling line of the battery cells is a flexible circuit board.

2. The battery module according to claim 1, wherein a first limiting element is disposed on both sides of the end plate, and the first limiting element protrudes from an outer surface of the end plate; and two sides of the cell management unit are each against a first limiting element on the corresponding side.

3. The battery module according to claim 1, wherein a second limiting element is disposed at the bottom of the end plate, and the second limiting element protrudes from an outer surface of the end plate; and a lower edge of the cell management unit is against an upper surface of the second limiting element.

4. The battery module according to claim 1, wherein the first hollow groove is located at a top of the end plate;

the connector assembly comprises a connection harness, a first connector, and a second connector, wherein the first connector and the second connector are disposed at two ends of the connection harness; and the first connector is connected to the sampling line of the two or more battery cells, and the second connector is connected to the cell management unit.

5. The battery module according to claim 4, wherein the cell management unit is provided with a second hollow groove, wherein the second hollow groove is opposite to the first hollow groove, and the second connector is disposed on an outer surface of the cell management unit.

6. The battery module according to claim 4, wherein the cell management unit comprises a cell management circuit board and a circuit box, wherein the circuit box is fixed to the outer surface of the end plate, and the cell management circuit board is disposed in the circuit box.

7. The battery module according to claim 6, wherein the circuit box is provided with a third limiting element, wherein the third limiting element protrudes from an outer surface of the circuit box; and the third limiting element is located below the connection harness, and is against an outer wall of the connection harness.

8. The battery module according to claim 7, wherein the third limiting element is provided with a fixing hole, and the connection harness is connected to the fixing hole of the third limiting element by using a fixing strap.

9. The battery module according to claim 1, wherein an inner surface of the end plate is opposite to a large face of a battery cell at an end of the module frame.

10. A battery box, comprising a battery module and a battery management system, wherein the battery module further comprises:

two or more battery cells;

a module frame, comprising an end plate and a side plate, wherein the end plate and the side plate form the module frame for fixing the battery cells; and a cell management unit, disposed on the end plate and connected to a sampling line of the battery cells by using a connector assembly, wherein the cell management unit is fixed to an outer surface of the end plate, and the end plate has a first hollow groove for avoiding the connector assembly;

wherein the sampling line of the battery cells is a flexible circuit board; and the battery management system is connected to the cell management unit.

11. The battery box according to claim 10, wherein a first limiting element is disposed on both sides of the end plate, and the first limiting element protrudes from an outer surface of the end plate; and two sides of the cell management unit are each against a first limiting element on the corresponding side.

12. The battery box according to claim 10, wherein a second limiting element is disposed at the bottom of the end plate, and the second limiting element protrudes from an outer surface of the end plate; and a lower edge of the cell management unit is against an upper surface of the second limiting element.

13. The battery box according to claim 10, wherein the first hollow groove is located at a top of the end plate;

the connector assembly comprises a connection harness, a first connector, and a second connector, wherein the first connector and the second connector are disposed at two ends of the connection harness; and the first connector is connected to the sampling line of the two or more battery cells, and the second connector is connected to the cell management unit.

14. The battery box according to claim 10, wherein an inner surface of the end plate is opposite to a large face of a battery cell at an end of the module frame.

15. An automobile, comprising a battery module, the battery module further comprising:

two or more battery cells;

a module frame, comprising an end plate and a side plate, wherein the end plate and the side plate form the module frame for fixing the battery cells; and a cell management unit, disposed on the end plate and connected to a sampling line of the battery cells by using a connector assembly, wherein the cell management unit is fixed to an outer surface of the end plate, and the end plate has a first hollow groove for avoiding the connector assembly;

wherein the sampling line of the battery cells is a flexible circuit board.

16. The automobile according to claim 15, wherein the automobile further comprises a battery management system, and the battery management system is connected to the cell management unit.

\* \* \* \* \*